United States Patent [19]

Monguzzi et al.

[11] Patent Number: 5,095,517
[45] Date of Patent: Mar. 10, 1992

[54] SWIVELLING OPTICAL CONNECTOR FOR JOINING OPTICAL FIBER TO COMPONENTS AND SENSOR INCLUDING SUCH CONNECTOR

[75] Inventors: Luigi Monguzzi, Nova Milanese; Giancarlo Moreni, Milan; Francesco Simonelli, Florence, all of Italy

[73] Assignee: Pirelli Cavi S.p.A., Milan, Italy

[21] Appl. No.: 657,425

[22] Filed: Feb. 19, 1991

[30] Foreign Application Priority Data

Feb. 20, 1990 [IT] Italy ................. 19412 A/90

[51] Int. Cl.⁵ .................. G02B 6/38; H01J 5/16
[52] U.S. Cl. .................. 385/90; 385/52; 385/62; 385/71; 385/74; 385/81; 385/89; 385/93; 250/227.11; 250/227.28
[58] Field of Search .............. 350/96.20, 96.21, 96.18, 350/96.22; 250/227.11, 227.28; 385/33, 52, 74, 84, 12, 90, 91, 93, 25, 62, 66, 81, 71

[56] References Cited

U.S. PATENT DOCUMENTS

| | | | |
|---|---|---|---|
| 4,303,301 | 12/1981 | Teichert et al. | 350/96.18 |
| 4,753,510 | 6/1988 | Sezerman | 350/96.21 |
| 4,889,406 | 12/1989 | Sezerman | 350/96.21 |
| 4,904,085 | 2/1990 | Spillman, Jr. et al. | 250/225 X |
| 4,978,850 | 12/1990 | Nakamura et al. | 250/227.11 |
| 4,997,254 | 3/1991 | Ganev | 350/96.20 |
| 4,998,797 | 3/1991 | van den Bergh et al. | 350/96.21 |
| 5,015,060 | 5/1991 | Tamagno et al. | 350/96.20 |

*Primary Examiner*—Brian Healy
*Attorney, Agent, or Firm*—Brooks Haidt Haffner & Delahunty

[57] ABSTRACT

Optical connectors adapted to join optical fibers to an optical component, each connector having an outer support to be fixedly secured to the component and provided with a housing receiving a movable element having a spherical-surface portion to which an optical fiber-holding body is connected. The spherical surface of the movable element is in contact with a mating surface of the outer support and permits pivoting or rotation of the movable element and the body housing the fiber about any axis passing through the center of the spherical surface itself. Tightening means for locking the movable element against the housing surface is provided, and such tightening means is adapted to prevent pivoting or rotation of the movable element itself by friction. The connector can be made entirely of dielectric materials.

25 Claims, 3 Drawing Sheets

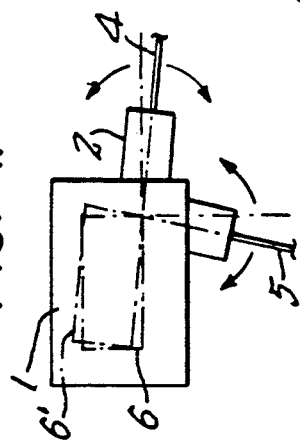
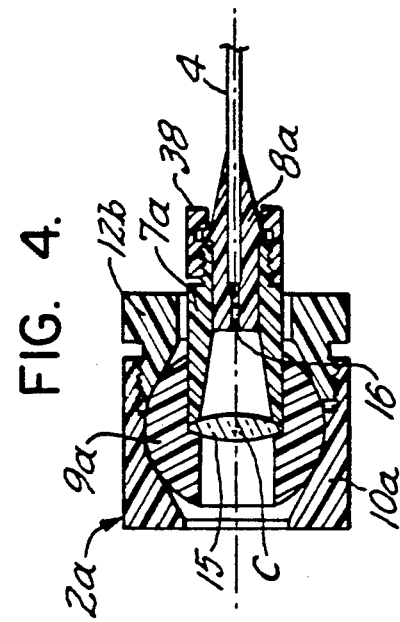
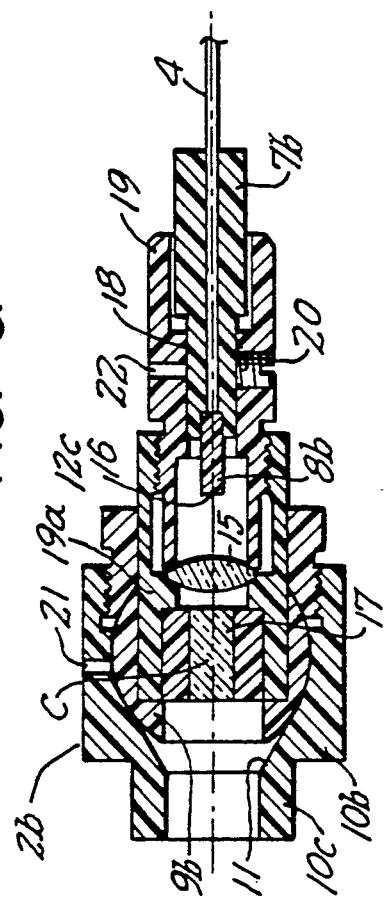
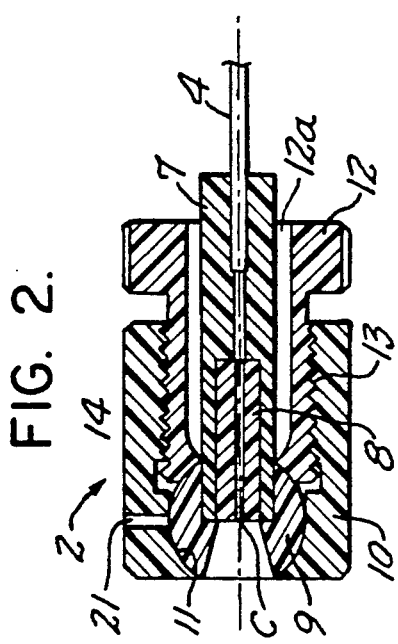
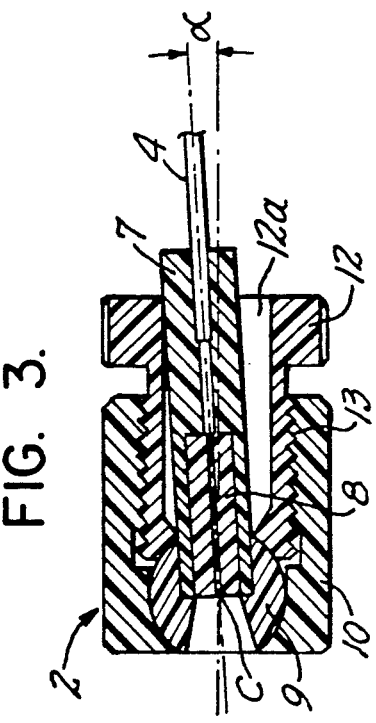

SWIVELLING OPTICAL CONNECTOR FOR JOINING OPTICAL FIBER TO COMPONENTS AND SENSOR INCLUDING SUCH CONNECTOR

FIELD OF THE INVENTION

The invention relates to a swivelling connector for joining optical fibers to optical units, such as optical sensors, for example, and to an optical sensor with one or more of such connectors.

BACKGROUND OF THE INVENTION

Optical equipment of various kinds, which will be generally defined in the following description as "optical sensors" for the sake of brevity, are already known, in which light beams are used to carry out different kinds of operations, such as detecting the variations that said light beams undergo in the presence of outside physical phenomena, the passage of current for example, thereby obtaining data corresponding to a measurement of the pheonomena themselves.

For the purpose, one or more light beams are supplied to the sensor by means of optical fibers which must be connected to the sensor at exact locations on the structure thereof.

Under these situations, fibers must be exactly located at the positions for which they are designed in order to make them correctly aligned with the optical paths inside the sensor.

In the case of laboratory equipment, the fibers are supported and disposed according to the desired positions and orientations by means of micrometric positioners of general use which are adapted to carry out translating or rotating operations on the members they are connected to by means of graduated scale micrometers through which the desired equipment adjustment is achieved.

Although these embodiments are expensive, bulky and delicate, they are acceptable in a laboratory, in case of equipment designed to carry out particular measurements, and they can be subsequently disassembled for operating in other different configurations due to the fact that they employ separate elements of general use.

If, on the contrary, equipment which is intended to be put on the market is made, or when the laboratory equipment is intended for permanent use, the embodiments described hereinbefore are quite unacceptable.

In particular, when commercial equipment is concerned, a reduced bulkiness and structures of great solidity are required which cannot be achieved by the use of positioners adapted for laboratories of the type described hereinbefore.

The industrial production of a sensor intended for commercialization may have accurately formed parts or housings so as to limit the requirements for position adjustments. However, the achievable construction tolerances, particularly in the case of large sized equipment providing optical paths extending some centimeters or decimeters beyond the fibers, cannot avoid an adjustment of the input and output directions of the light beam which is necessary in order to achieve the greatest intensity of the optical signals.

In addition, in some applications there is the requirement of using sensors in which metal or current conducting components are absent, whereas the laboratory positioners cannot omit the use of metal parts, that is, parts made of steel or light alloys.

Therefore, it is necessary to produce optical connectors adapted to join the ends of fibers carrying or receiving the optical signals to the equipment in which said signals are processed, which connectors will enable the required alignments to be accomplished while avoiding the use of metal materials and bulky and delicate equipment.

SUMMARY OF THE INVENTION

One object of the present invention is to provide connectors of reduced cost, made of dielectric materials and having a compact configuration which are capable of enabling a quick and gradual adjustment of the position and direction of the axis of the optical fibers introduced thereinto.

A further object of the present invention is to provide a swivelling connector for joining optical fibers to optical units which comprises an outer support to be rigidly connected to the unit and provided with a housing accommodating a movable element having a spherical surface portion to which a fiber-holding body is connected. The end of an optical fiber is held within the body, and the spherical surface of the movable element is in contact with a mating surface of the outer support which enables the rotation of the element itself and of the fiber-receiving body about any axis passing through the center of the spherical surface. Locking means is provided for locking the spherical-surface, movable element against the housing, such locking means being adapted to prevent pivoting of the movable element by friction.

In one embodiment of the invention, the locking means for locking the spherical-surface, movable element with respect to the outer support housing comprises a locking nut with threads engageable with threads on the outer support, such locking nut having a surface mating with the spherical surface of the movable element and in contact therewith, on the side opposite to the mating surface of the outer support housing.

Preferably, the surface of the housing which mates with the spherical surface of the movable element is a conical surface, the axis of which passes through the center of said spherical surface, and also, the surface of the locking nut which mates with the spherical surface of the movable element is a conical surface, the axis of the latter passing through the center of said spherical surface.

In one embodiment of the invention, the fiber-holding body within which the optical fiber end is held is integral with the movable, spherical-surface element.

The optical fiber end can come out of the body within which it is fixed into a plane passing through the center of the spherical-surface. Alternatively, a lens may be housed within the movable spherical-surface element, the end of the optical fiber being held within the fiber-holding body at a focus of the lens.

In accordance with an alternative embodiment, the fiber-holding body within which the optical fiber end is held is connected to the spherical-surface element in an axially slidable manner, and tightening means for friction locking the body relative to the spherical-surface element are provided. Thus, axial adjustment of the end position of the optical fiber relative to the lens focus can be accomplished.

An optical anisotropic element can be engaged within the spherical-surface movable element, and the connector can be directed so as to give the right orientation to said optical element depending on the optical features thereof.

According to a further alternative embodiment of the invention, which is mechanically and operationally equivalent to the described embodiments, the means locking the movable spherical-surface element against the outer support housing comprises a locking nut having threads engageable with threads on a portion of the movable element coaxial with the fiber-holding support, the outer support being provided with a spherical-surface concentric with that of the movable element and the locking nut having a surface mating with the spherical-surface of the outer support and in contact therewith at the side opposite to the outer support housing.

The swivelling connector of the invention, in any one of the described or equivalent embodiments, can be completely made of dielectric materials.

Preferably, at least the spherical-surface element, the outer support and the locking means are made of polymeric materials having high surface hardness and low sliding friction.

The polymeric materials having high surface hardness and low sliding friction comprise acetal resins, epoxy resins and the like, optionally containing mineral fillers.

In the swivelling connector in accordance with the invention, adhesive material can be present between the movable element and the housing thereof in the outer body and/or between the fiber-holding body and the spherical-surface movable element and is applied through associated passageways after adjusting the position of the movable element and/or fiber-holding body.

A further object of the present invention is an optical sensor comprising an element carrying an optical beam from a sensor input position to a sensor output position through an operating area inside the sensor, and at least a connector joining an optical input fiber adapted to send an optical beam into the sensor which beam travels to an optical output fiber adapted to receive the optical beam coming out of the sensor. At least one of the connectors can be angularly oriented and comprises an outer support fastened to the sensor and having a housing within which a movable element is received. The movable element is provided with a spherical-surface portion in contact with the housing and is rotatable, on contact with the housing itself, about any axis passing through the center of the spherical surface. A fiber-holding body housing the end of an optical fiber is connected to tightening means for locking the spherical-surface of the movable element against the housing the outer support and is adapted to frictionally prevent the movable element from rotating.

The angularly-orientable swivelling connector, or each of the angularly-orientable swivelling connectors in the sensor, are made in accordance with the previously described features.

The optical sensor in accordance with the invention can be completely made of dielectric materials.

BRIEF DESCRIPTION OF THE DRAWINGS

Other objects and advantages of the present invention will be apparent from the following detailed description of the presently preferred embodiments thereof, which description should be considered in conjunction with the accompanying drawings in which:

FIG. 1 is a schematic diagram of an optical measuring equipment provided with connectors for joining optical fibers;

FIG. 2 is an enlarged, axial section view of a swivelling connector for joining one optical fiber to equipment of the type shown in FIG. 1;

FIG. 3 shows the connector of FIG. 2 with the fiber in a angularly oriented position;

FIGS. 4 and 5 illustrate in axial section alternative embodiments of a swivelling connector;

DETAILED DESCRIPTION OF PREFERRED EMBODIMENTS

Figure 6:
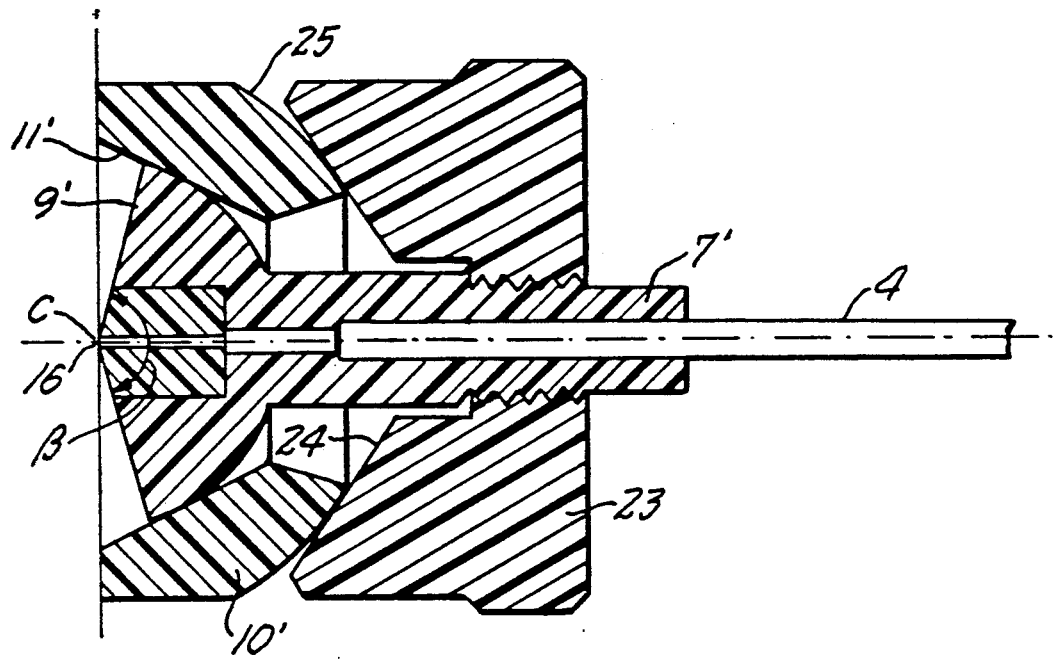
FIG. 6 illustrates in axial section a further embodiment of the swivelling connector of the invention.

As shown in FIG. 1, an optical unit, generally referred to as an "optical sensor" in the following description, has a body 1 to which at least two connectors 2, 3 for optical fibers 4,5 are secured, respectively, at the input and output for an optical beam conveyed by the fibers 4 and 5, which beams follow a specific path 6 within the sensor, the path 6 being diagrammatically indicated in FIG. 1 by a dot-dash line, as a result, for example, of multiple reflections inside the body 1.

Due to unavoidable construction or manufacturing tolerances, particularly, if the sensor body is of a large size, the optical path at the inside of the body 1 can have small variations which cause the output position and direction of the beam to be not coincident with the optical axis of the respective connector and the fiber connected thereto, giving rise to a partial light loss.

In such cases, even if very reduced construction tolerances are imposed, position shiftings inevitably occur in the light beams on the order of some fractions of millimeter, or some degrees, and it is necessary to carry out an orientation of the input and output connectors so as to achieve the maximum light intensity for the beam as it is transferred from one fiber to the other.

For example, as diagrammatically shown in FIG. 1, an optical beam supplied through the connector 2 into the sensor body 1 and guided inside it along the path 6, can have, at the output, a location different from that of the optical axis of the connector 3 and the associated fiber 5. Under these conditions, the setting-up of the sensor can involve an orientation of the connector 2 so as to bring the outgoing optical beam to the desired position, corresponding to the input of the connector 3, and hence, following path 6'. The connector 3, in turn, must be oriented so as to make the axis thereof coincident with the axis of the beam 6' so that no losses in the signal take place.

For such purpose, in accordance with the present invention, a swivelling connector is provided, some embodiments of which are shown in FIGS. 2, 4, 5 and 6, the connector being of compact structure and easily adjusted.

The connectors 2 and 3 can be of the same construction and only one of the connectors, e.g. connector 2, is shown in FIGS. 1-7. In general, the connector 2 comprises a fiber-holding body 7, inside of which a ferrule 8 is housed and to which an optical fiber 4 is connected. The body 7 is integral with a movable element 9 having a surface portion of spherical form with its center at C.

The element 9 is received in an outer support 10 having a surface 11 mating the spherical surface of the element 9. Conveniently, the surface 11 is a conical or spherical surface with a radius equal to or greater than the radius of the spherical surface of the movable element 9.

The movable element 9 is kept in contact with the surface 11 by a locking means, conveniently of the threaded type, which can be loosened to enable the rotation of the movable element 9 of the fiber-holding body 7 integral therewith about any axis passing through the center of its spherical surface and which can be tightened until it prevents said rotation by reason of the friction between the spherical surface on the element 9 and the surface 11.

In one embodiment, illustrated in FIGS. 2 and 3, the locking means comprises a locking nut 12 which can be tightened by means of threads 13 on the nut 12 and the outer support 10 and which acts on the movable element 9 by its contacting surface 14 which mates with the spherical surface of the movable element 9.

Conveniently, surface 14 can be of conical form, its axis the center of the spherical surface 9 and being coaxial with the axis of the surface 11. Alternatively, for example, the surface 14 can be of spherical form, its radius being the same as, or greater than, the radius of the spherical surface of the movable element 9, so that it is in contact with the latter spherical surface along a complete circle.

The described structure enables the assembly consisting of the body 7 and spherical element 9 to be oriented, as shown in FIG. 3, for example, through an angle α sufficient to achieve the desired alignment, when the locking nut 12 is loose, whereas the rotation of the element 9 can be prevented by friction, after carrying out the orientation, by tightening the locking nut 12 itself.

As shown in FIGS. 2, 3, the maximum amplitude of the angular orienting range depends on the relative diameters of the opening 12a in the locking nut 12 and the body 7.

The orienting operations of the body 7 and the tightening operations of the locking nut 12 can be in most cases carried out by hand, with the aid of detectors, or the like, for measuring the light intensity of the outgoing beam. In fact, more or less tightening of the locking nut 12 enables the most appropriate resistance to rotation of the body 7 to be generated by friction, and the required accuracy in the body inclination can be obtained by manually manipulation the fiber-holding body 7.

Should a still more precise adjustment be needed, the body 7 could be connected to a micrometric positioner of a type well known in the field and by which the body 7 can be oriented and then locked to the exact position by the locking nut 12, the positioner afterwards being removed.

FIG. 4 illustrates a preferred embodiment of the invention in which a lens 15 is provided inside the spherical element 9a, the center of which is coincident with the center C of the spherical surface of element 9a and which is adapted to focus a light beam at the output end 16 of fiber 4 in the ferrule 8a.

The ferrule 8a is held within the body 7a by a nut 38 with threads engaging threads on the body 7a. The lens 15 is held within the spherical element 9a by the body 7a. The spherical element 9a is held within the housing 10a by a locking nut 12b corresponding to the nut 12.

By virtue of this embodiment, it is possible to have a beam coming out of the connector 2a which is collimated according to the orientation axis of the body 7a or to send an input beam to the fiber 4, and the embodiment is particularly appropriate for applications in the field of optical sensors.

FIG. 5 shows a further alternative embodiment of the invention, in which, at the rotation center C of the spherical element 9b, an optical component 17 is provided.

If the component 17 is an anisotropic element, such as a polariser, a delay plate or the like, the connector 2b of the invention can enable the alignment with other components of the system to be carried out.

With this embodiment, which can provide a rotation according to one or more of the three spaced axes passing through the center of the component, alignment can easily be accomplished by means of the spherical element 9b, and the achieved position can then be readily fixed by the locking nut 12c.

In addition to component 9b, it is possible to provide a lens 15, of an appropriate focal length, as previously described.

The embodiment shown in FIG. 5 also provides for the body 7 receiving the ferrule 8b and the optical fiber 4 to be axially shifted relative to the spherical element 9b and, in particular, relative to the lens 15 integral therewith.

By virtue of such structure, it is, for example, possible to alter the distance between the lens 15 and the end 16 of the fiber 4 at the end of the ferrule 8, so as to obtain collimated converging or diverging beams according to requirements.

For such adjustment, the fiber-holding body 7 is slidably received within the hole 18 of a bushing 19 which threadingly engages a tubular body 19a integral with the spherical element 9. A set screw 20, or similar friction locking means, enables the axial sliding of body 7 to be prevented once the desired axial distance has been found either by hand or through micrometric positioners.

This feature, as is apparent to those skilled in the art, is independent of the presence of the optical component 17 and of lens 15, and therefore, the described structure can also be present in a connector in accordance with the embodiments shown in FIG. 2 or 4.

The outer support 10b and, if present, the bushing 19 can have holes 21, 22 into which an adhesive material can be introduced, after carrying out the appropriate adjustments, for the final locking of the connector to the selected position.

Figure 7:
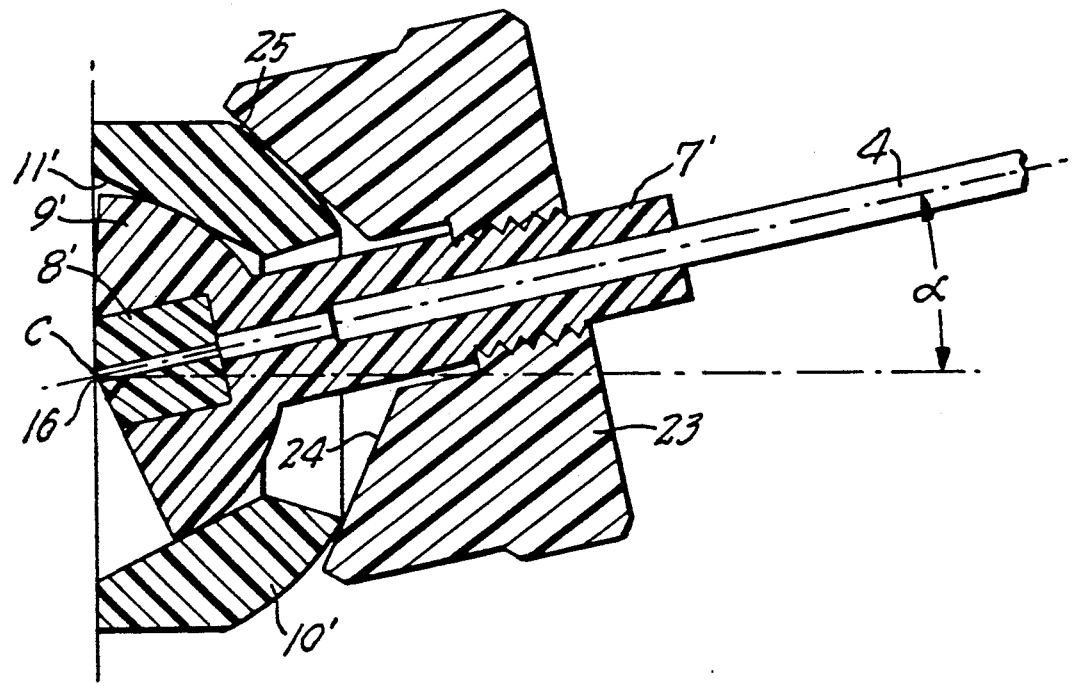
FIG. 7 shows the swivelling connector of FIG. 6 with the fiber in an angularly oriented position.

FIGS. 6, 7 show a further alternative embodiment, equivalent in results to the preceding embodiments, in which, in order to achieve better axial compactness and to dispose the outgoing end 16 of the fiber 4 into the connector in coincidence with the center C of rotation of the spherical element 9', or ahead thereof, said spherical element in axial section, is in the form of a sector of a circle included in a solid angle β smaller than 180°, and is received within the outer support 10' the bearing surface 11' of which mating that of the spherical element being, for example, of conical form. A fiber-holding body 7' with a ferrule 8' is connected to the element 9' either fixedly or slidably as shown in FIG. 5.

A locking nut 23 has threads which either directly engage threads on the fiber-holding body 7', if the latter is integral with the spherical element 9' as shown, or engage an extension of the element 9' within which the body 7' is contained as indicated in FIG. 5. Said locking nut 23 has a surface 24, for example, a conical surface, engaging the outer surface 25 of the outer support 10' which is of spherical form and which is concentric with the spherical surface of the element 9'.

The tightening of the locking nut 23 enables the rotation of the spherical element 9' to be prevented by friction in the same manner as is described in the previously described embodiments.

In all of the embodiments shown, the fastening of the connector to the equipment for which it is intended can be carried out through the outer support 10, 10a, 10b or 10'. For example, in the embodiment shown in FIG. 5, the outer support 10b has a substantially cylindrical outer surface and has a front portion 10c of cylindrical form and of reduced diameter which is adapted to be introduced into an opening in a housing present in the equipment and to be locked to the housing, for example, by means of a set screw or the like.

Alternatively, any other fastening means, such as, for example, a flanged or threaded attachment, can be employed, based on the features and the materials used for making the connector and the equipment it is intended for.

Figure 8:
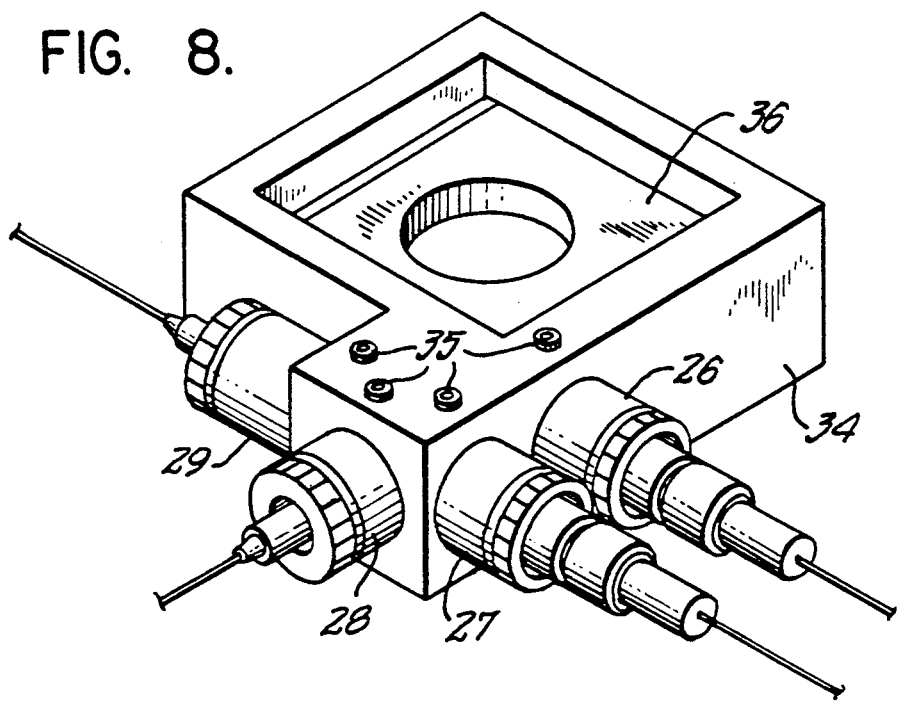
FIG. 8 is a perspective view of an optical measuring equipment provided with swivelling connectors in accordance with the invention.
Figure 9:
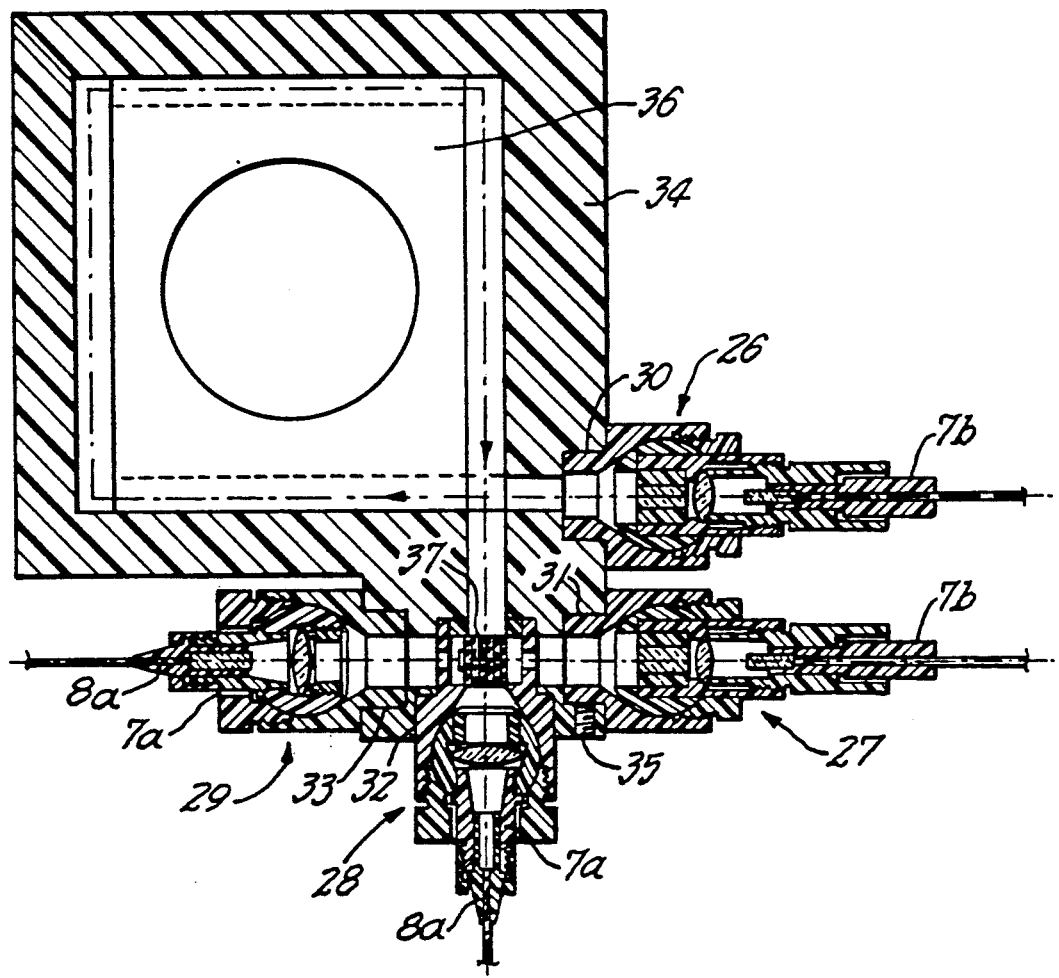
FIG. 9 is a cross-sectional view of the equipment of FIG. 8 as taken along a horizontal plane containing the axes of the connectors.

FIGS. 8 and 9 exemplify an application of the connectors in accordance with the invention to a polarimetric current sensor.

In the equipment shown in FIGS. 8 and 9, the input connectors 26, 27 for the optical measurement beam and optical reference beam, respectively, and the output connectors 28, 29, are introduced into respective openings 30, 31, 32 and 33 in the sensor body 34, and held therein by means of set screws 35.

In FIGS. 8 and 9, connectors of the type shown in FIG. 4 and in FIG. 5 are used. Integral with the outer support of connector 28 is a polarization divider 37 based upon the operating features of the specific equipment represented which is, as stated, a polarimetric current sensor known per se, for example, from the Italian patent application No. 22041 A/89, and therefore, is not described in greater detail herein. The orientation of the divider 37 can be adjusted by rotating the whole connector within the opening in which it is received without the possibility of orientation of the fiber within the connector being restricted thereby.

In order to obviate close construction tolerances for the reflection planes in the light guide element 36 housed within the body 34, such element 36 determining the optical paths in the sensor and such paths being represented in dot-dash lines in FIG. 9, the connectors thus mounted are oriented during the equipment assembling step following the procedures previously described. To this end, it is possible to proceed, for example, with the sending of a beam by a fiber joined to an input connector and observing the intensity of the beam at the respective output connector so as to orient the fiber-holding body 7a or 7b of the input connector until a maximum beam at the output, substantially corresponding to the arrival of the beam at the core of the fiber carried by the output connector, is achieved. Then, tightening the respective locking nut to the obtained position is accomplished.

Subsequently, still observing the beam intensity in the fiber joined to the output connector, the orientation of the latter is carried out looking for a new maximum intensity of the outgoing beam greater than the preceding one and corresponding to the correct angular alignment between the axis of the outgoing beam and the axis of the fiber designed to receive it.

After the desired positions have been reached, the connectors are locked to the respective locations by introducing adhesive material or the like into the same through the respective holes, so that the connector positions become fixed even in the presence of vibrations and so that accidental loosening of the respective locking nuts or the like which may take place during the use of the equipment is prevented.

Based upon requirements, the connectors in accordance with the invention can be made of metal materials, such as, for example, steel or light alloys, or of polymeric materials.

The use of polymeric materials which can be applied to all of the connector components, although possibly excepting the optical elements such as lenses, polarizators or the like, which, in any event, can be made of non-metallic materials, enables the whole sensor to be formed with dielectric materials, including, if necessary, the body 34 and the connectors. Such feature is highly desirable for equipment designed to be applied close to high voltages, for example, where traditional positioners, for which the use of at least some non-metallic components is required, give rise to great difficulties in application.

The polymeric materials adapted for the purpose, in particular for making the spherical element 9, 9a, 9b or 9' and the parts provided with the contact housings for said spherical element, in particular, the outer support 10, 10a, 10b or 10' and locking nut 12, 12b, 12c or 23, conveniently are low-friction and high surface-hardness materials, capable of sliding on each other in a smooth manner and without giving rise to jamming or local deformation phenomena. For example, such materials can be acetal resins, epoxy resins with added mineral fillers, fluorinated resins and the like.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. A swivel connector for joining an optical fiber to an optical component having a body and for permitting orientation of the axis of the optical fiber, said connector comprising:

a movable element having an external surface at least part of which is defined by a sphere, said element having an opening with an axis co-incident with the center of said sphere;

a tubular element having a bore for receiving an optical fiber, said tubular element being connected to said movable element for movement with said movable element and with the axis of said bore passing through said center of said sphere;

a tubular housing receiving said movable element and adapted to be secured to the body of the optical component, said housing having an interior surface which engages said external surface of said movable element at least along a line peripherally of said axis of said opening in said movable element;

releasable tightening means acting between said tubular housing and said movable element for pressing said external surface of said movable element against said interior surface of said housing and thereby frictionally preventing relative movement between said external surface and said interior surface; and a lens mounted on said tubular element in alignment with said bore of said tubular element for receiving light from an optical fiber within said bore whereby said lens moves with said tubular element and movement of said movable element.

2. A swivel connector as set forth in claim 1 wherein said housing has screw threads thereon and said tightening means is a locking nut with screw threads engaging said screw threads on said housing and which is disposed on the side of said movable element opposite from said interior surface, said locking nut having an engaging surface at the portion thereof nearer said external surface which engages said external surface at least along a line peripherally of said axis of said opening in said movable element.

3. A swivel connector as set forth in claim 2 wherein said engaging surface is conical.

4. A swivel connector as set forth in claim 2 wherein said engaging surface is in the shape of a portion of a sphere.

5. A swivel connector as set forth in claim 1 wherein said interior surface is defined by a cone having an axis which passes through said center of said sphere.

6. A swivel connector as set forth in claim 1 wherein said interior surface is defined by a sphere and the axis of said interior surface passes through said center of the first-mentioned said sphere.

7. A swivel connector as set forth in claim 1 wherein said tubular element is integral with said movable element.

8. A swivel connector as set forth in claim 1 wherein the end of said tubular element lies in a plane passing through said enter of said sphere.

9. A swivel connector as set forth in claim 1 wherein an end portion of said tubular element nearer said center of said sphere is spaced from said center of said sphere and wherein said lens is mounted on said end portion of said tubular element and disposed in said opening in said movable element with its focus axis coincident with said axis of said bore.

10. A swivel connector as set forth in claim 9 wherein said lens is spaced from said center of said sphere.

11. A swivel connector as set forth in claim 1 wherein said connector comprises only dielectric materials.

12. A swivel connector as set forth in claim 1 wherein at least said movable element, said tubular housing and said releasable tightening means are made of polymeric materials.

13. A swivel connector as set forth in claim 12 wherein said polymeric materials are selected from the group consisting of acetal resins and epoxy resins optionally containing mineral fillers.

14. A swivel connector as set forth in claim 1 further comprising an adhesive between at least one of said tubular housing and said movable element, on the one hand, and said tubular element and said movable element, on the other hand, for maintaining said movable element in a fixed position after adjustment thereof.

15. An optical sensor comprising walls defining a passageway for the passage of light, said sensor having a light input opening and a light output opening, and connectors, one for each opening, at each opening and secured to said walls, each said connector comprising:

a movable element having an external surface at least part of which is defined by a sphere, said element having an opening with an axis co-incident with the center of said sphere;

a tubular element having a bore for receiving an optical fiber, said tubular element being connected to said movable element for movement with said movable element and with the axis of said bore passing through said center of said sphere;

a tubular housing receiving said movable element and adapted to be secured to the body of the optical component, said housing having an interior surface which engages said external surface of said movable element at least along a line peripherally of said axis of said opening in said movable element;

releasable tightening means acting between said tubular housing and said movable element for pressing said external surface of said movable element against said interior surface of said housing and thereby frictionally preventing relative movement between said external surface and said interior surface; and a lens mounted on said tubular element in alignment with said bore of said tubular element for receiving light from an optical fiber within said bore whereby said lens moves with said tubular element and movement of said movable element.

16. An optical sensor as set forth in claim 15 wherein each said connector has an optical fiber in said bore of said tubular element and engaged by the wall of said bore.

17. An optical sensor as set forth in claim 15 wherein said sensor including said connectors comprises only dielectric materials.

18. A swivel connector for joining an optical fiber to an optical component having a body and for permitting orientation of the axis of the optical fiber, said connector comprising:

a movable element having an external surface at least part of which is defined by a sphere, said element having an opening with an axis co-incident with the center of said sphere;

a tubular element having a bore for receiving an optical fiber, said tubular element being connected to said movable element for movement with said movable element and with the axis of said bore passing through said center of said sphere, an end portion of said tubular element nearer said center of said sphere being spaced from said center of said sphere;

a tubular housing receiving said movable element and adapted to be secured to the body of the optical component, said housing having an interior surface which engages said external surface of said movable element at least along a line peripherally of said axis of said opening in said movable element;

releasable tightening means acting between said tubular housing and said movable element for pressing said external surface of said movable element against said interior surface of said housing and thereby frictionally preventing relative movement between said external surface and said interior surface; and a lens disposed in said opening of said movable element at said center of said sphere and at said end portion of said tubular element with its focus axis co-incident with said axis of said bore.

19. A swivel connector for joining an optical fiber to an optical component having a body and for permitting orientation of the axis of the optical fiber, said connector comprising:

a movable element having an external surface at least part of which is defined by a sphere, said element having an opening with an axis co-incident with the center of said sphere;

a tubular element having a bore for receiving an optical fiber, said tubular element being connected to said movable element for movement with said movement element and with the axis of said bore passing through said center of said sphere, an end portion of said tubular element nearer said center of said sphere being spaced from said center of said sphere;

a tubular housing receiving said movable element and adapted to be secured to the body of the optical component, said housing having an interior surface which engages said external surface of said movable element at least along a line peripherally of said axis of said opening in said movable element;

releasable tightening means acting between said tubular housing and said movable element for pressing said external surface of said movable element against said interior surface of said housing and thereby frictionally preventing relative movement between said external surface of said interior surface;

a lens disposed in said opening between said movable element and said center of said sphere and said end portion of said tubular element with its focus axis co-incident with said axis of said bore; and said tubular element being slidably connected to said movable element for slidable movement in the direction axially of said bore for permitting adjustment of the position of the end of a fiber in said bore with respect to said lens and further comprising locking means for locking said tubular element in a desired axial position.

20. A swivel connector for joining an optical fiber to an optical component having a body and for permitting orientation of the axis of the optical fiber, said connector comprising:

a movable element having an external surface at least part of which is defined by a sphere, said element having an opening with an axis co-incident with the center of said sphere;

a tubular element having a bore for receiving an optical fiber, said tubular element being connected to said movable element for movement with said movable element and with the axis of said bore passing through said center of said sphere;

a tubular housing receiving said movable element and adapted to be secured to the body of the optical component, said housing having an interior surface which engages said external surface of said movable element at least along a line peripherally of said axis of said opening in said movable element;

releasable tightening means acting between said tubular housing and said movable element for pressing said external surface of said movable element against said interior surface of said housing and thereby frictionally preventing relative movement between said external surface and said interior surface; and an anisotropic element in said opening in said movable member.

21. A swivel connector for joining an optical fiber to an optical component having a body and for permitting orientation of the axis of the optical fiber, said connector comprising:

a movable element having an external surface at least part of which is defined by a sphere, said element having an opening with an axis co-incident with the center of said sphere;

a tubular element having a bore for receiving an optical fiber, said tubular element being connected to said movable element for movement with said movable element and with the axis of said bore passing through said center of said sphere;

a tubular housing receiving said movable element and adapted to be secured to the body of the optical component, said housing having an interior surface which engages said external surface of said movable element at least along a line peripherally of said axis of said opening in said movable element;

releasable tightening means acting between said tubular housing and said movable element for pressing said external surface of said movable element against said interior surface of said housing and thereby frictionally preventing relative movement between said external surface and said interior surface; and said interior surface being between said external surface and said releasable tightening means, said tubular housing having an exterior surface at least part of which is defined by a further sphere having a diameter greater than the diameter of the first-mentioned said sphere, said further sphere being concentric with the first-mentioned said sphere, said tubular element has screw threads thereon and said releasable tightening means comprises a locking nut with screw threads engaging said screw threads on said tubular element and having a locking surface engageable with said exterior surface of said tubular housing.

22. An optical sensor comprising walls defining a passageway for the passage of light, said sensor having a light input opening and a light output opening, and connectors, one for each opening, at each opening and secured to said walls, each said connector comprising:

a movement element having an external surface at least part of which is defined by a sphere, said element having an opening with an axis co-incident with the center of said sphere;

a tubular element having a bore for receiving an optical fiber, said tubular element being connected to said movable element for movement with said movable element and with the axis of said bore passing through said center of said sphere, an end portion of said tubular element nearer said center of said sphere being spaced from said center of said sphere;

a tubular housing receiving said movable element and adapted to be secured to the body of the optical component, said housing having an interior surface which engages said external surface of said movable element at least along a line peripherally of said axis of said opening in said movable element;

releasable tightening means acting between said tubular housing and said movable element for pressing said external surface of said movable element against said interior surface of said housing and thereby frictionally preventing relative movement between said external surface and said interior surface; and a lens disposed in said opening of said movable element at said center of said sphere and at said end portion of said tubular element with its focus axis co-incident with said axis of said bore.

23. An optical sensor comprising walls defining a passageway for the passage of light, said sensor having a light input opening and a light output opening, and connectors, one for each opening, at each opening and secured to said walls, each said connector comprising:

a movable element having an external surface at least part of which is defined by a sphere, said element having an opening with an axis co-incident with the center of said sphere;

a tubular element having a bore for receiving an optical fiber, said tubular element being connected to said movable element for movement with said movable element and with the axis of said bore passing through said center of said sphere, an end portion of said tubular element nearer said center of said sphere being spaced from said center of said sphere;

a tubular housing receiving said movable element and adapted to be secured to the body of the optical component, said housing having an interior surface which engages said external surface of said movable element at least along a line peripherally of said axis of said opening in said movable element;

releasable tightening means acting between said tubular housing and said movable element for pressing said external surface of said movable element against said interior surface of said housing and thereby frictionally preventing relative movement between said external surface and said interior surface;

a lens disposed in said opening between said movable element and said center of said sphere and said end portion of said tubular element with its focus axis co-incident with said axis of said bore; and said tubular element being slidably connected to said movable element for slidable movement in the direction axially of said bore for permitting adjustment of the position of the end of a fiber in said bore with respect to said lens and further comprising locking means for locking said tubular element in a desired axial position.

24. An optical sensor comprising walls defining a passageway for the passage of light, said sensor having a light input opening and a light output opening, and connectors, one for each opening, at each opening and secured to said walls, each said connector comprising:

a movable element having an external surface at least part of which is defined by a sphere, said element having an opening with an axis co-incident with the center of said sphere;

a tubular element having a bore for receiving an optical fiber, said tubular element being connected to said movable element for movement with said movable element and with the axis of said bore passing through said center of said sphere;

a tubular housing receiving said movable element and adapted to be secured to the body of the optical component, said housing having an interior surface which engages said external surface of said movable element at least along a line peripherally of said axis of said opening in said movable element;

releasable tightening mean acting between said tubular housing and said movable element for pressing said external surface of said movable element against said interior surface of said housing and thereby frictionally preventing relative movement between said external surface and said interior surface; and an anisotropic element in said opening in said movable member.

25. An optical sensor comprising walls defining a passageway for the passage of light, said sensor having a light input opening and a light output opening, and connectors, one for each opening, at each opening and secured to said walls, each said connector comprising:

a movable element having an external surface at least part of which is defined by a sphere, said element having an opening with an axis co-incident with the center of said sphere;

a tubular element having a bore for receiving an optical fiber, said tubular element being connected to said movable element for movement with said movable element and with the axis of said bore passing through said center of said sphere;

a tubular housing receiving said movable element and adapted to be secured to the body of the optical component, said housing having an interior surface which engages said external surface of said movable element at least along a line peripherally of said axis of said opening in said movable element;

releasable tightening means acting between said tubular housing and said movable element for pressing said external surface of said movable element against said interior surface of said housing and thereby frictionally preventing relative movement between said external surface and said interior surface; and said interior surface being between said external surface and said releasable tightening means, said tubular housing having an exterior surface at least part of which is defined by a further sphere having a diameter greater than the diameter of the first-mentioned said sphere, said further sphere being concentric with the first-mentioned said sphere, said tubular element has screw threads thereon and said releasable tightening means comprises a locking nut with screw threads engaging said screw threads on said tubular element and having a locking surface engageable with said exterior surface of said tubular housing.

* * * * *